(12) United States Patent
Ito et al.

(10) Patent No.: US 11,582,909 B2
(45) Date of Patent: Feb. 21, 2023

(54) MOWER UNIT

(71) Applicant: Kubota Corporation, Osaka (JP)

(72) Inventors: Hirokazu Ito, Sakai (JP); Kazuaki Matsuda, Sakai (JP)

(73) Assignee: Kubota Corporation, Osaka (JP)

( * ) Notice: Subject to any disclaimer, the term of this patent is extended or adjusted under 35 U.S.C. 154(b) by 627 days.

(21) Appl. No.: 16/668,809

(22) Filed: Oct. 30, 2019

(65) Prior Publication Data

US 2020/0367431 A1 Nov. 26, 2020

(30) Foreign Application Priority Data

May 21, 2019 (JP) .............................. JP2019-095356

(51) Int. Cl.
| | |
|---|---|
| *A01D 34/00* | (2006.01) |
| *A01D 34/82* | (2006.01) |
| *A01D 34/66* | (2006.01) |
| *A01D 34/78* | (2006.01) |

(52) U.S. Cl.
CPC ............. *A01D 34/82* (2013.01); *A01D 34/66* (2013.01); *A01D 34/78* (2013.01)

(58) Field of Classification Search
CPC ......... A01D 34/82; A01D 34/66; A01D 34/78
See application file for complete search history.

(56) References Cited

U.S. PATENT DOCUMENTS

| | | | | |
|---|---|---|---|---|
| 2,991,612 A | | 7/1961 | Holmes | |
| 3,696,593 A | * | 10/1972 | Thorud | F02N 15/006 123/179.22 |
| 5,274,987 A | * | 1/1994 | Wiener | A01D 34/73 56/14.8 |
| 6,101,794 A | * | 8/2000 | Christopherson | A01D 34/71 280/124.179 |
| 8,794,209 B2 | * | 8/2014 | Klika | A01D 42/00 180/299 |
| 10,842,078 B1 | * | 11/2020 | Goings | A01D 69/08 |
| 2004/0152565 A1 | | 8/2004 | Wasson et al. | |
| 2012/0246943 A1 | | 10/2012 | Yuasa | |
| 2012/0323420 A1 | * | 12/2012 | Koike | B60K 7/0007 701/41 |
| 2013/0152538 A1 | | 6/2013 | Fiser et al. | |
| 2015/0359170 A1 | * | 12/2015 | Ito | A01D 34/78 56/16.9 |
| 2017/0013780 A1 | * | 1/2017 | Ito | A01D 34/73 |

(Continued)

FOREIGN PATENT DOCUMENTS

| | | |
|---|---|---|
| EP | 2611277 | 7/2013 |
| EP | 3257352 A1 | 12/2017 |

(Continued)

*Primary Examiner* — Hau V Phan

(74) *Attorney, Agent, or Firm* — The Webb Law Firm

(57) ABSTRACT

The mower unit includes a mower deck having a top wall and side walls extending downwards from an outer circumferential edge of the top wall, a rotational shaft extending upwards through the top wall from an inside space formed by the top wall and the side walls, a cutter blade attached to a lower portion of the rotational shaft within the inside space and rotatable together with the rotational shaft, an electric mower motor having an output shaft that can rotatably drive the rotational shaft, and a flywheel rotatable in association with the rotational driving of the mower motor.

5 Claims, 3 Drawing Sheets

(56) References Cited

U.S. PATENT DOCUMENTS

| | | | |
|---|---|---|---|
| 2017/0135283 A1* | 5/2017 | Ito | A01D 34/81 |
| 2017/0354088 A1 | 12/2017 | Yuki et al. | |
| 2018/0235149 A1 | 8/2018 | Ito et al. | |
| 2018/0303027 A1* | 10/2018 | Koike | B62D 11/04 |
| 2018/0326860 A1* | 11/2018 | Ito | B60L 7/10 |

FOREIGN PATENT DOCUMENTS

| | | |
|---|---|---|
| JP | 2012210182 A | 11/2012 |
| JP | 201718054 A | 1/2017 |
| WO | 2012030325 A1 | 3/2012 |

* cited by examiner

MOWER UNIT

CROSS-REFERENCE TO RELATED APPLICATION

This application claims priority to Japanese Patent Application No. 2019-095356 filed May 21, 2019, the disclosure of which is hereby incorporated by reference in its entirety.

A grass mower machine disclosed in Japanese Unexamined Patent Application Publication No. 2017-18054 includes an electrically powered mower unit. This mower unit includes a plurality of cutter blades. The cutter blades are operably coupled to a rotational shaft, which extends through a top wall of a mower deck. On a side wall of the mower deck, a mower motor is mounted, and power of the mower motor is transmitted to the rotational shaft via a power transmission mechanism. The mower motor is provided on a mounting deck. When the mower motor is to be mounted to the mounting deck, a mounting face portion formed in the mower motor is overlapped in face contact with a mounted face portion formed in the mounting deck. As heat generated by the mower motor is transmitted to the mower deck via the mounting deck, heat discharge from the mower motor is promoted. Meanwhile, with such grass mower machine as above, rotation of the cutter blades needs to be continued at a preset rotational speed. With the conventional grass mower machine, reduction in the rotational speed of the mower motor is conceivable in case the cutter blades are subjected temporarily to resistance from grass or the like. In such case the load on the mower motor too will increase and a larger amount of heat than that generated at the time of rotation under a low load will be generated in the mower motor. Although it is conceivable to take a measure of increasing the capacity of the mower motor with view to avoidance of heat damage in the mower motor, such capacity increase of the mower motor only for the sake of coping with temporally occurring load is disadvantageous in the respect of costs. In view of the above-described state of the art, an object of the present invention is to provide a mower unit capable of suppressing occurrence of rotational speed reduction of the mower motor or heat generation of the mower motor due to load, while suppressing increase in the capacity of the mower motor.

SUMMARY OF THE INVENTION

According to the present invention, a mower unit comprises:

a mower deck having a top wall and side walls extending downwards from an outer circumferential edge of the top wall;

a rotational shaft extending upwards through the top wall from an inside space formed by the top wall and the side walls;

a cutter blade attached to a lower portion of the rotational shaft within the inside space and rotatable together with the rotational shaft;

an electric mower motor having an output shaft that can rotatably drive the rotational shaft; and a flywheel rotatable in association with the rotational driving of the mower motor.

With the present invention, since a flywheel is rotatable in association with the rotational driving of the mower motor, the inertial energy of the rotation is stored in the flywheel. Therefore, even when a load is applied to the mower motor, the mower motor can be easily maintained at a preset rotational speed, thanks to the inertial energy available from the flywheel. Moreover, when the cutter blade is temporarily subjected to a resistance from grass, etc., the resultant load can be dispersed to the mower motor and to the flywheel. Thus, in comparison with an arrangement having no flywheel, heat generation from the mower motor can be suppressed. With this, there is realized a mower unit capable of suppressing occurrence of rotational speed reduction of the mower motor or heat generation of the mower motor due to load, while suppressing increase in the capacity of the mower motor.

According to a preferred mode of embodying the above-described configuration:

the flywheel is rotatable about the output shaft.

With the above-described arrangement, since the rotational shaft of the flywheel acts also as the output shaft of the mower motor, in comparison with an arrangement providing a rotational shaft dedicated to the flywheel, the number of components can be reduced, thus being advantageous in terms of costs. Further, since the flywheel and the mower motor are rotated together by the same rotational shaft, in comparison with an arrangement in which the flywheel and the mower motor are rotated by respective separate output shafts, the inertial energy of the flywheel can be transmitted to the mower motor in an efficient manner. Thus, even when a load is applied to the mower motor, the rotational speed of the mower motor can be maintained easily.

According to a preferred mode of embodying the above-described configuration:

the mower unit further comprises a plurality of fan blades formed along the entire circumference of a side of the flywheel on which the mower motor is located.

With the above-described arrangement, an air circulation is generated from the fan blades in association with rotation of the flywheel. With this, forcible air cooling of the mower motor is made possible, so that heat generation of the mower motor can be suppressed even more effectively.

According to a preferred mode of embodying the above-described configuration:

the output shaft protrudes from one end portion of a motor housing of the mower motor to the side on which the flywheel is located;

a partition cover configured to cover the flywheel and the output shaft is provided on more side opposite to the side on which the motor housing is located than where the flywheel is located;

an isolated space is formed as a space surrounded by the one end portion and the partition cover; and the flywheel and the output shaft are disposed in the isolated space.

With the above-described arrangement, since an isolated space is formed by the partition cover, possible entrance of dust such as cut grass into this isolated space can be avoided. Thus, there is no risk of dust such as cut grass getting entangled with the output shaft and/or the flywheel. Namely, since no dust such as cut grass enters the isolated space, there is no need for a cleaning operation of the isolated space by a worker. Further, in the case of an arrangement in which the above-described fan blades being formed in the flywheel, there is no risk of dust such as cut grass getting entangled with the fan blades, so that forcible air cooling of the mower motor can be maintained favorably.

According to a preferred mode of embodying the above-described configuration:

the mower unit further comprises:

an output pulley rotatable about the output shaft;

an input pulley rotatable about the rotational shaft on a side of the rotational shaft more upward than the top wall; and a belt entrained around and between the output pulley and the input pulley;

wherein the one end portion is an upper portion of the mower motor; and wherein the output pulley, the input pulley and the belt are disposed in the isolated space.

With the above-described arrangement, inside the isolated space, the output pulley, the input pulley and the belt are disposed and the flywheel also is disposed therein. Therefore, the mechanism for transmitting power from the mower motor is all completed within the isolated space. Therefore, there is no possibility of dust such as cut grass entering the isolated space, so that power transmission from the mower motor to the cutter blade can be maintained favorably.

DETAILED DESCRIPTION OF THE PREFERRED EMBODIMENTS

Figure 1:
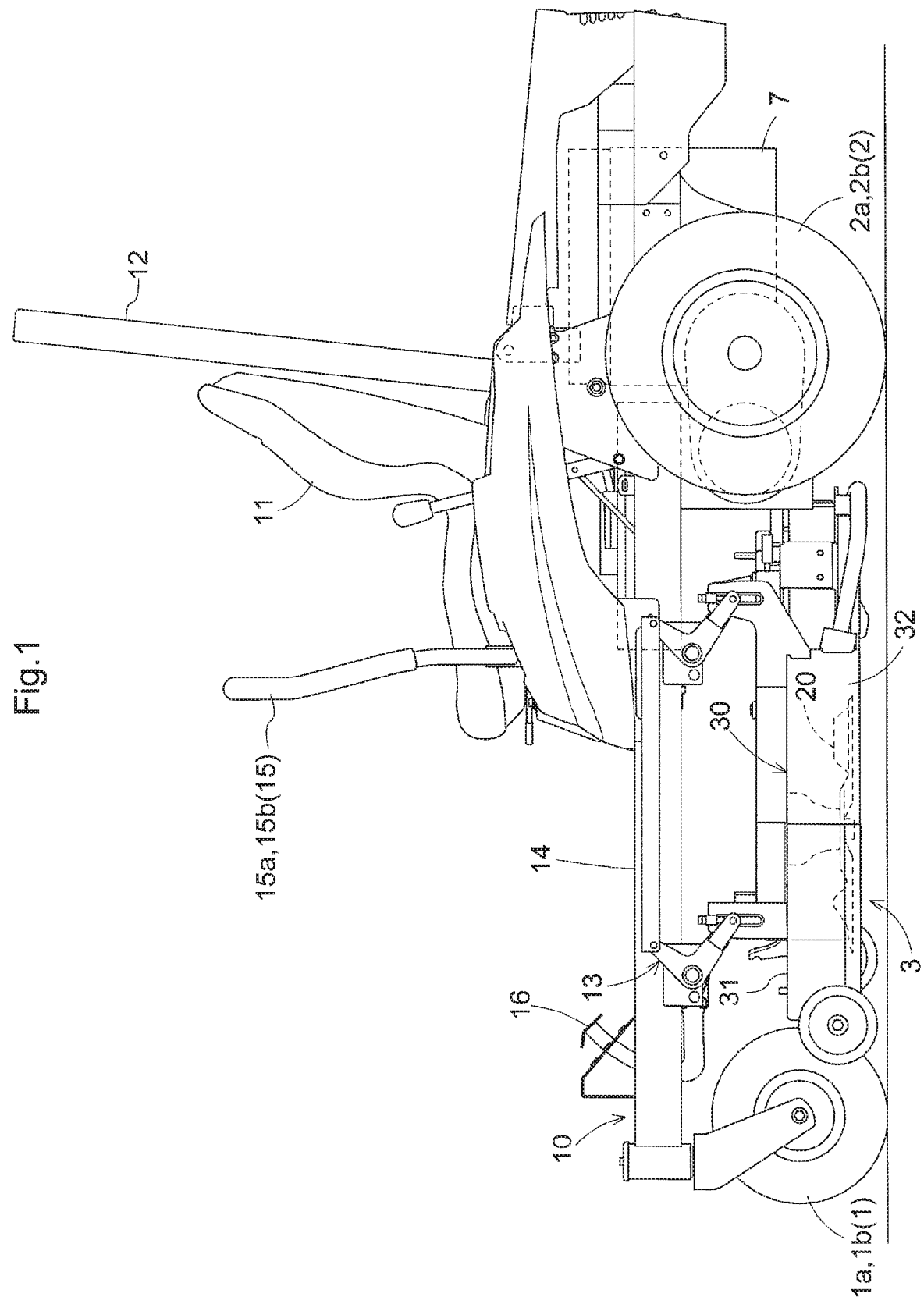
FIG. 1 is a left side view of a riding type grass mower machine.

With reference to the accompanying drawings, there will be explained a mid-mount riding type grass mower machine mounting a mower unit according to one embodiment of the present invention. FIG. 1 shows a left side view of the grass mower machine. Incidentally, here, unless indicated otherwise, "front" means the front side with respect to a machine body front/rear direction (traveling direction) and "rear" means the rear side with respect to the machine body front/rear direction (traveling direction). Further, "left/right direction" or "lateral direction" means the machine body transverse direction (machine body width direction) perpendicular to the machine body front/rear direction. Further, "upper" or "lower" respectively represents a positional relation with respect to the perpendicular direction (vertical direction) of the machine body, representing the relation in the respect of ground surface clearance.

This grass mower machine includes a vehicle body frame 10 supported by a front wheel unit 1 and a drive wheel unit 2, a battery 7, a driver's seat 11 and a ROPS (roll-over protection system) frame 12. The front wheel unit 1 includes a left front wheel 1a and a right front wheel 1b. The left front wheel 1a and the right front wheel 1b respectively is a freely rotatable caster type wheel. The drive wheel unit 2 includes a left rear wheel 2a and a right rear wheel 2b. The battery 7 is disposed at a rear portion of the vehicle body frame 10 and the driver's seat 11 is disposed on more front side than the battery 7. The ROPS frame 12 is disposed vertically upwards on the vehicle body frame 10 at a position between the driver's seat 11 and the battery 7. Downwardly of the vehicle body frame 10, a mower unit 3 is provided at a space between the front wheel unit 1 and the drive wheel unit 2, with the mower unit 3 being suspended to be liftable up/down via a lift link mechanism 13 from the vehicle body frame 10.

On a side forwardly of the driver's seat 11, a floor plate 14 is formed. This flow plate 14 constitutes a "footrest" for a riding person. From the front portion of the floor plate 14, a brake pedal 16 protrudes rearwardly upwards. On the left and right opposed sides of the driver's seat 11, there are disposed a pair of left and right maneuvering units 15, specifically, a left maneuvering lever 15a and a right maneuvering lever 15b. Each one of these left maneuvering lever 15a and right maneuvering lever 15b is pivotable about a horizontal shaft extending in the machine body transverse direction.

Figure 2:
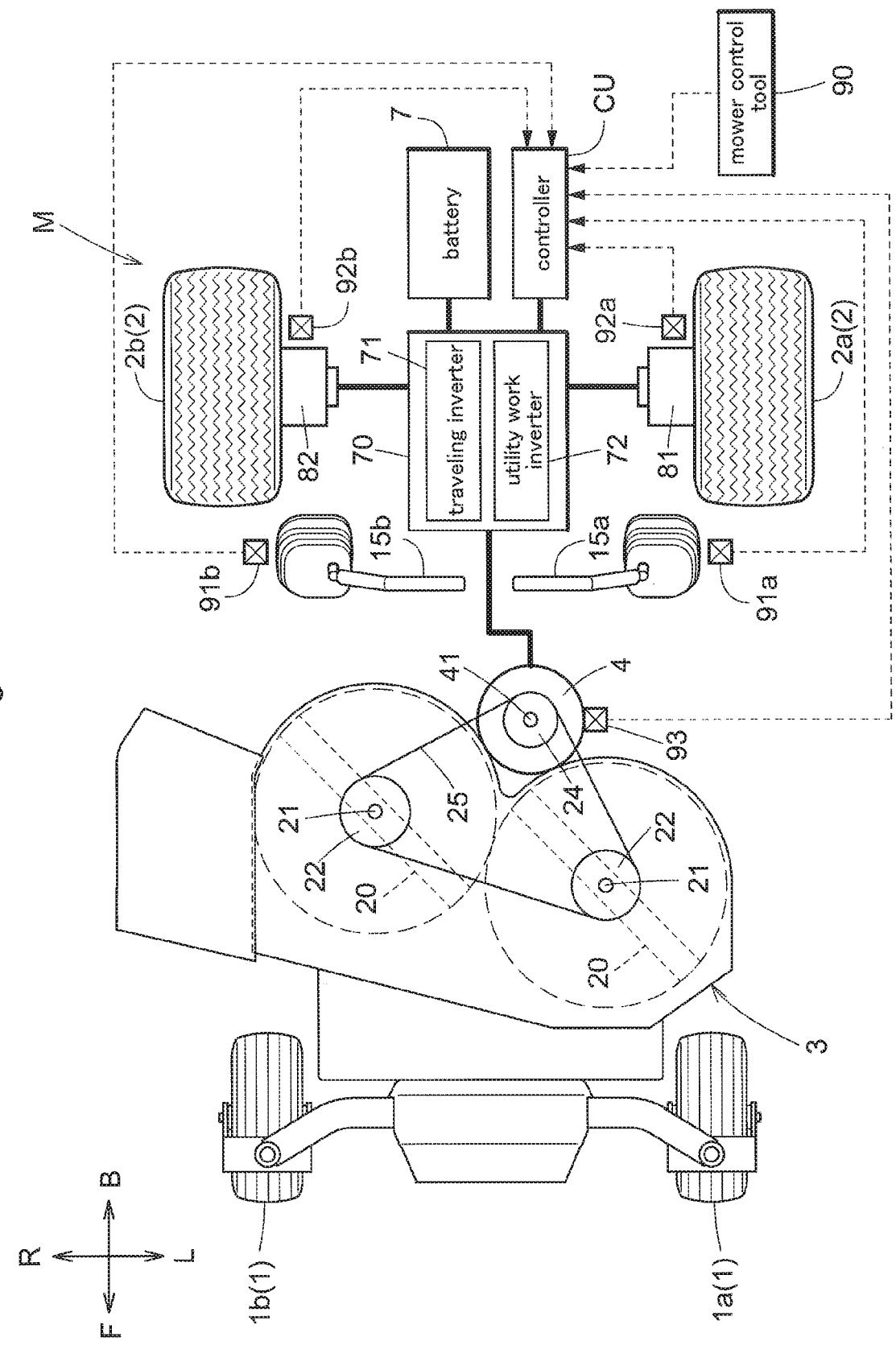
FIG. 2 is a power system diagram of the riding type grass mower machine.

As shown in FIG. 1 and FIG. 2, the mower unit 3 is of a side-discharge type. The mower unit 3 includes a mower deck 30 and two rotary type cutter blades 20, 20. A pair of rotational shafts 21, 21 corresponding to the pair of cutter blades 20, 20 respectively extend downwards through a top wall 31 of the mower deck 30. The pair of rotational shafts 21, 21 are rotatably supported to the top wall 31 with use of bearings. And, at a lower portion of each rotational shaft 21 (the lower end in this embodiment), the corresponding cutter blade 20 is fixed.

Each cutter blade 20, 20 can be rotatably driven by a mower motor 4. This mower motor 4 has a flat shape and is an electrically powered motor referred to commonly also as a "pan cake motor". At the leading end of an output shaft 41 of the mower motor 4, an output pulley 24 is attached. Further, in the upper end portion of the respective rotational shaft 21, 21 and at a position more upwards than the top wall 31, an input pulley 22 is attached. This input pulley 22 is rotatable about the rotational shaft 21 in unison therewith. Between/across and around these two input pulleys 22, 22, a tension pulley 23 and the output pulley 24, there is entrained a belt 25. Namely, in the instant embodiment, a mechanism for transmitting power from the output shaft 41 to the cutter blades 20, 20 is constituted of a belt transmission mechanism.

As shown in FIG. 2, the left rear wheel 2a is rotatably driven by a left motor 81. The right rear wheel 2b is rotatably driven by a right motor 82. Each of the left motor 81 and the right motor 82 is an electric motor. And, there is provided an inverter section 70 that is capable of supplying electric power to the left motor 81, the right motor 82 and the mower motor 4. The inverter section 70 includes a traveling inverter 71 and a utility work (implement) inverter 72. The traveling inverter 71 can supply electric power to the left motor 81 and the right motor 82. The utility work inverter 72 can supply electric power to the mower motor 4. The inverter section 70 drives the motors based on control signals from a controller CU.

To the controller CU, there are connected a mower control tool 90, a left maneuvering angle detection sensor 91a, a right maneuvering angle detection sensor 91b, a left rotation detection sensor 92a, a right rotation detection sensor 92b, and a mower rotational speed sensor 93. The mower control tool 90 is used for effecting ON/OFF operations and rotational speed adjustment of the mower motor 4. The left maneuvering angle detection sensor 91a detects a pivot angle of the left maneuvering lever 15a. The right maneuvering angle detection sensor 91b detects a pivot angle of the right maneuvering lever 15b. The left rotation detection sensor 92a detects a rotational speed of the left motor 81. The right rotation detection sensor 92b detects a rotational speed of the right motor 82. The mower rotational speed sensor 93 detects a rotational speed of the mower motor 4.

Based on a pivot angle of the left maneuvering lever 15a detected by the left maneuvering angle detection sensor 91a, the controller CU calculates a rotational speed (number of rotations) of the left rear wheel 2a, namely a rotational speed (number of rotations) of the left motor 81. Further, based on a pivot angle of the right maneuvering lever 15b detected by the right maneuvering angle detection sensor 91b, the controller CU calculates a rotational speed (number of rotations) of the right rear wheel 2b, namely a rotational speed (number of rotations) of the right motor 82. Then, the controller CU outputs control signals of the respective rotational speeds of the left motor 81 and the right motor 82 to the traveling inverter 71. The traveling inverter 71 can output electric powers independent of each other for the left motor 81 and the right motor 82, respectively, so that the traveling inverter 71 is capable of making the respective rotational speeds of the left rear wheel 2a and the right rear wheel 2b different from each other. And, based on such speed difference created between the left rear wheel 2a and the right rear wheel 2b, a turning of the grass mower machine is effected.

Figure 3:
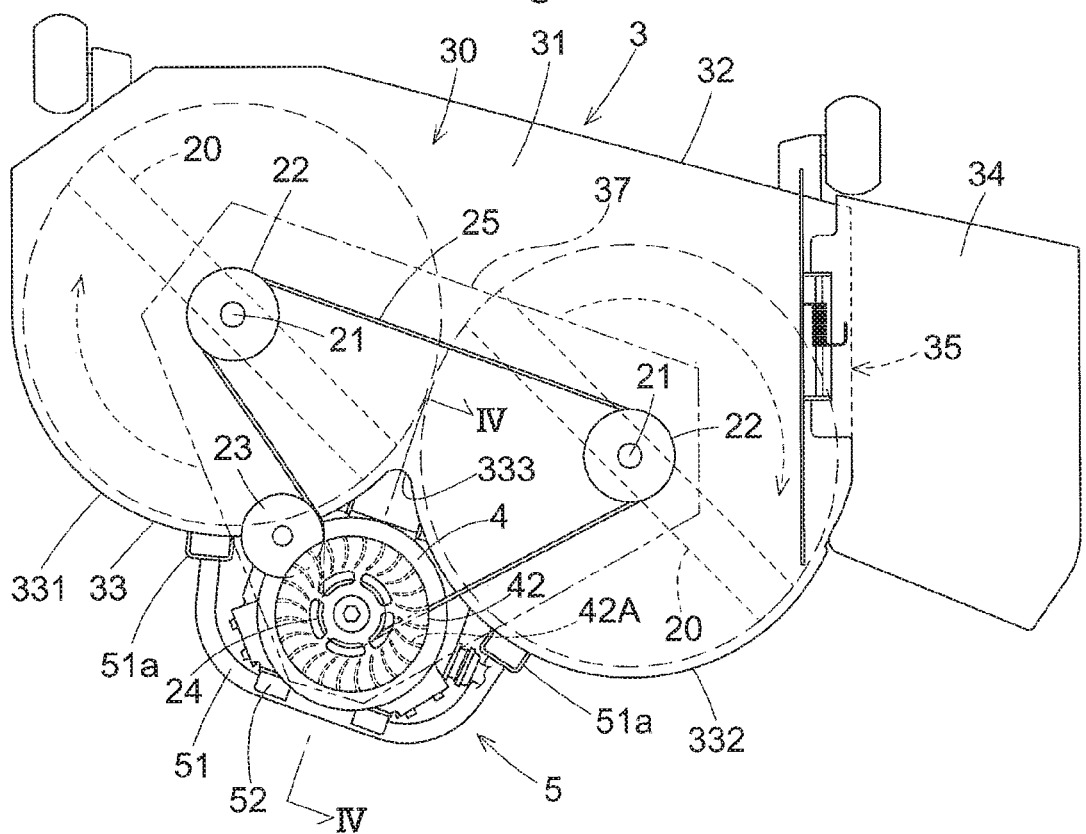
FIG. 3 is a plan view of a mower unit.

As shown in FIG. 3, the pair of left and right cutter blades 20, 20 are disposed side by side in the machine body transverse direction. The mower deck 30 includes the top wall 31 as well as a front wall 32 and a rear wall 33 which respectively extend downwards from the outer circumferential edge of the top wall 31. The front wall 32 is continuous with the front-side outer circumferential edge of the top wall 31 and the rear wall 33 is continuous with the rear-side outer circumferential edge of the same. The front wall 32 and the rear wall 33 have their respective right-end areas thereof cutaway, thus creating a cut-grass discharge opening 35 covered by a cover 34. Further, the top wall 31, the front wall 32 and the rear wall 33 together create an inside space of the mower deck 30, and the cutter blades 20, 20 are disposed in this inside space. Each cutter blade 20 is attached to a lower portion of the corresponding rotational shaft 21 and is rotatable together with this rotational shaft 21. The rotational shaft 21 extends upwards through the top wall 31 from the above-described inside space created by the top wall 31, the front wall 32 and the rear wall 33.

In the area upwardly of the top wall 31, the area where the above-described belt transmission mechanism is located is covered by a partition cover 37. In other words, the partition cover 37 is disposed on more side opposite to the position of the motor housing 40 than where the flywheel 42 is disposed. The partition cover 37 covers the flywheel 42 and the output shaft 41. The partition cover 37 is coupled with the top wall 31 and the mower motor 4. The partition cover 37 includes a top plate and a side plate extending downwards from the outer circumferential edge of the top plate. The side plate of the partition cover 37 is formed along the entire circumference of the top plate. Namely, the partition cover 37 covers, from the above, the upper portion of the mower motor 4, the two input pulleys 22, 22, the tension pulley 23 and the belt 25. And, as the space surrounded by the partition cover 37, the top wall 31 and the upper portion of the mower motor 4, an isolated space S (see FIG. 4) is formed. This isolated space S is closed by the partition cover 37, the top wall 31 and the upper portion of the mower motor 4 and is defined as a space isolated from the outside. In this isolated space S, the flywheel 42, the output shaft 41, the input pulleys 22, 22, the tension pulley 23, the output pulley 24 and the belt 25 are disposed.

The rear wall 33 is curved in such a manner as to follow the outer circumferential edges of the rotational loci of the cutter blades 20, 20 as seen in the plan view. The rear wall 33 is formed of a left arcuate portion 331, a right arcuate portion 332 and a curved portion 333. The left arcuate portion 331 is formed arcuate along the outer circumferential edge of the rotational locus of the cutter blade 20 disposed on the left side of the machine body. The right arcuate portion 332 is formed arcuate along the outer circumferential edge of the rotational locus of the cutter blade 20 disposed on the right side of the machine body. The curved portion 333 is formed to bridge over respective valley portions each having an arcuate shape of the left arcuate portion 331 and the right arcuate portion 332. And, a space is formed to flare rearwardly from the curved portion 333 along the left arcuate portion 331 and the right arcuate portion 332. In this space, there is provided a mounting portion 5. On this mounting portion 5, the mower motor 4 is mounted. In this, the shape of the curved portion 333 may be a shape along the outer circumferential shape of the mower motor 4 as seen in the plan view. Further alternatively, the curved portion 333 and the outer circumferential shape of the mower motor 4 may be arranged to come into gapless contact with each other.

The mounting portion 5 includes a curved frame 51 formed of a pipe, and an attachment bracket 52 fixed to the curved frame 51. At the opposed ends of the curved frame 51, fixing brackets 51a are provided. And, these fixing brackets 51a are fixed to the left arcuate portion 331 and the right arcuate portion 332 respectively. For promoting heat discharge from the mower motor 4, the curved frame 51 and the attachment brackets 52 are made of aluminum alloy having high heat conductivity. And, the fixing brackets 51a are fixed to both the left arcuate portion 331 and the right arcuate portion 332 to be kept in maximal face contact with each other. With these arrangements, heat generated from the mower motor 4 will be transmitted to the left arcuate portion 331 and the right arcuate portion 332 in an efficient manner, whereby the mower motor 4 can be cooled efficiently. Additionally, heat discharge fins may be provided in the mounting portion 5.

[Flywheel of Mower Motor]

Figure 4:
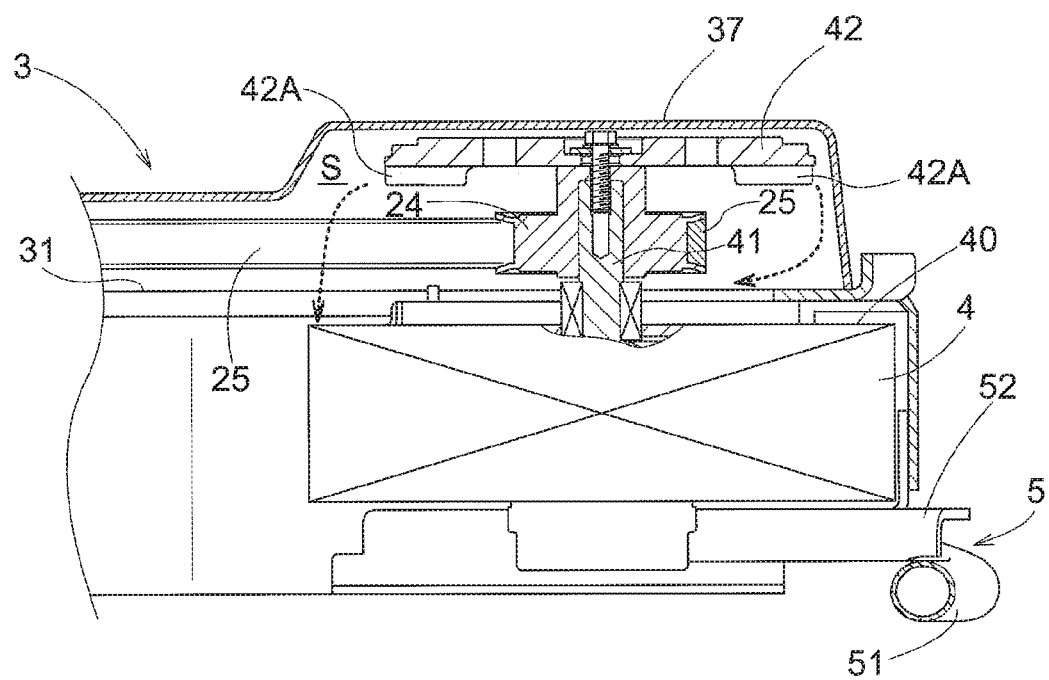
FIG. 4 is a vertical section taken along Iv-Iv line in FIG. 3 showing a mower motor and a flywheel.

As shown in FIG. 4, the output shaft 41 of the mower motor 4 is supported under a vertical posture to the motor housing 40 via a bearing. And, the upper end portion of the output shaft 41 protrudes from the motor housing 40. And, to this protruding portion of the output shaft 41, the output pulley 24 and the flywheel 42 are attached. The output pulley 24 and the flywheel 42 respectively can rotate in union about the output shaft 41.

The flywheel 42 is attached to a portion more upwards than the output pulley 24. The outside diameter of the flywheel 42 is designed larger than the outside diameter of the output pulley 24. When the mower motor 4 rotatably drives the cutter blades 20, 20, the mower motor 4 and the flywheel 42 are rotated together, and the rotational energy will be stored in the flywheel 42. When a load applied to the mower motor 4 is less than a rated output of the mower motor 4, the mower motor 4 will output a torque required for maintaining the rotation. Under this condition, if the cutter blades 20, 20 receive large resistance from grass, lawn or the like and the load applied to the mower motor 4 may temporarily exceed the rated output of the mower motor 4, the rotation of the flywheel 42 continues due to the inertial moment, thus suppressing reduction in the rotational speed of the mower motor 4. In other words, in case the load applied to the mower motor 4 temporarily rises above the rated output of the mower motor 4, the inertial force provided by the flywheel 42 and the output torque of the mower motor 4 together provide a force to the cutter blades 20, 20 to maintain the rotational speed. With this, even when the cutter blades 20, 20 receive significant resistance from grass, lawn, etc., the rotational speeds of the cutter blades 20, 20 can be readily maintained without sharp drops.

In the flywheel 42, at its face portion on the side where the mower motor 4 is disposed, there are formed fan blades 42A along the entire circumference. A plurality of such fan blades 42A are provided in spaced relationship from each other in the lower face portion of the flywheel 42. In association with rotation of the flywheel 42, there is generated an air current from the axial side portions of the fan blades 42A toward the outer circumference side thereof. Namely, the flywheel 42 is used also as a "turbo fan". Of the mower motor 4, its portion located on more upper side than the motor housing 40 is covered by the partition cover 37. Thus, due to the centrifugal force of the fan blades 42A, the amount of air current generated toward the outer side beyond the outer circumferential edges of the fan blades 42A will flow along the inner wall of the partition cover 37 and this air current will strike against the upper portion of the motor housing 40, thus cooling this motor housing 40. With this, cooling of the mower motor 4 is promoted; thus, even when a load exceeding its rated output is applied to the mower motor 4, heat generation of the mower motor 4 can be suppressed.

The air current that cools the mower motor 4 is generated by rotation of the fan blades 42A and will circulate on the inner side of the isolated space S defined by the partition cover 37 and the top wall 31. As this isolated space S is a space isolated from the outside, powder dust or the like blown up by rotation of the cutter blades 20, 20 will be prevented from entering the inside of the isolated space S. With this, there is no risk of the gaps between the fan blades 42A being blocked by the powder dust or the like, and the air current associated with rotation of the fan blades 42A can be generated smoothly.

Further Embodiments

The present invention is not limited to the arrangements disclosed in the foregoing embodiment. Next, some typical further embodiments of the present invention will be described.

(1) In the foregoing embodiment, the flywheel 42 is provided on the output shaft 41. Instead, the flywheel 42 may not be provided on the output shaft 41. For instance, the flywheel 42 may be provided on one or both of the pair of rotational shafts 21, 21 corresponding respectively to the cutter blades 20, 20. In this case, it may be arranged such that the inertial energy of the flywheel 42 may be transmitted to the mower motor 4 via the belt 25. Further alternatively, another flywheel 42 may be provided on one or both of the pair of rotational shafts 21, 21. Namely, as for the flywheel 42, it will suffice if it is arranged to be rotatable in association with rotational drive of the mower motor 4.

(2) In the foregoing embodiment, the flywheel 42 is located upwardly of the mower motor 4. Alternatively, the flywheel 42 may be provided on the side opposite to the side of the output pulley 24 across the mower motor 4 therebetween.

(3) In the foregoing embodiment, the output pulley 24 and the flywheel 42 are provided as separate entities. Alternatively, the output pulley 24 and the flywheel 42 can be formed integral.

(4) In the foregoing embodiment, the mower motor 4 need not be a so-called "pancake motor". Alternatively, a motor having a shape that provides a lower inertial moment can be employed as the mower motor 4. Namely, it will suffice for an electrically powered mower motor 4 to have an output shaft 41 which can rotatably drive the rotational shafts 21.

(5) In the foregoing embodiment, in the flywheel 42, a plurality of fan blades 42A are formed. Instead, the flywheel 42 may be without such fan blades 42A formed therein. In this case, a blower fan separately from the flywheel 42 may be provided on the output shaft 41. This blower fan can be a centrifugal type fan or an axial flow type fan.

(6) The belt 25 used in the foregoing embodiment may be replaced by a chain. Further, instead of the arrangement of the respective cutter blades 20, 20 being driven via the belt 25, they may be driven via a gear mechanism. Further, they may be driven by a direct drive arrangement with the mower motor 4.

Incidentally, the configurations disclosed in the above-described embodiment (including the further embodiments, and the same hereinafter) can be applied in combination with the configurations disclosed in the other embodiments) as long as no contradiction results from such combination(s). The embodiments disclosed in the present specification are merely exemplary, and the embodiments of the present invention are not limited thereto, but can be modified appropriately without departing from the subject of the present invention.

The invention claimed is:

1. A mower unit comprising:
   a mower deck having a top wall and side walls extending downwards from an outer circumferential edge of the top wall;
   a rotational shaft extending upwards through the top wall from an inside space formed by the top wall and the side walls;
   a cutter blade attached to a lower portion of the rotational shaft within the inside space and rotatable together with the rotational shaft;
   an electric mower motor provided in a motor housing and having an output shaft that can rotatably drive the rotational shaft;
   a flywheel rotatable in association with the rotational driving of the mower motor; and
   a partition cover provided along a side of the flywheel which side is opposite to a side of the flywheel which side faces the motor housing,
   wherein the partition cover and one end portion of the motor housing define an isolated space with the partition cover covering the flywheel and the output shaft, and
   wherein the flywheel and the output shaft are disposed in the isolated space.

2. The mower unit of claim 1, wherein the flywheel is rotatable about the output shaft.

3. The mower unit of claim 1, further comprising a plurality of fan blades formed along the entire circumference of a side of the flywheel on which the mower motor is located.

4. The mower unit of claim 1, wherein:
   the output shaft protrudes from the one end portion of the motor housing of the mower motor to the side on which the flywheel is located.

5. The mower unit of claim 4, further comprising:
   an output pulley rotatable about the output shaft;
   an input pulley rotatable about the rotational shaft on a side of the rotational shaft more upward than the top wall; and
   a belt entrained around and between the output pulley and the input pulley;
   wherein the one end portion is an upper portion of the mower motor; and wherein the output pulley, the input pulley and the belt are disposed in the isolated space.

* * * * *